Oct. 1, 1935.  W. C. GROBLE  2,015,931
LOADING DEVICE OR ATTACHMENT FOR FLUID PRESSURE REGULATORS
Filed May 17, 1934
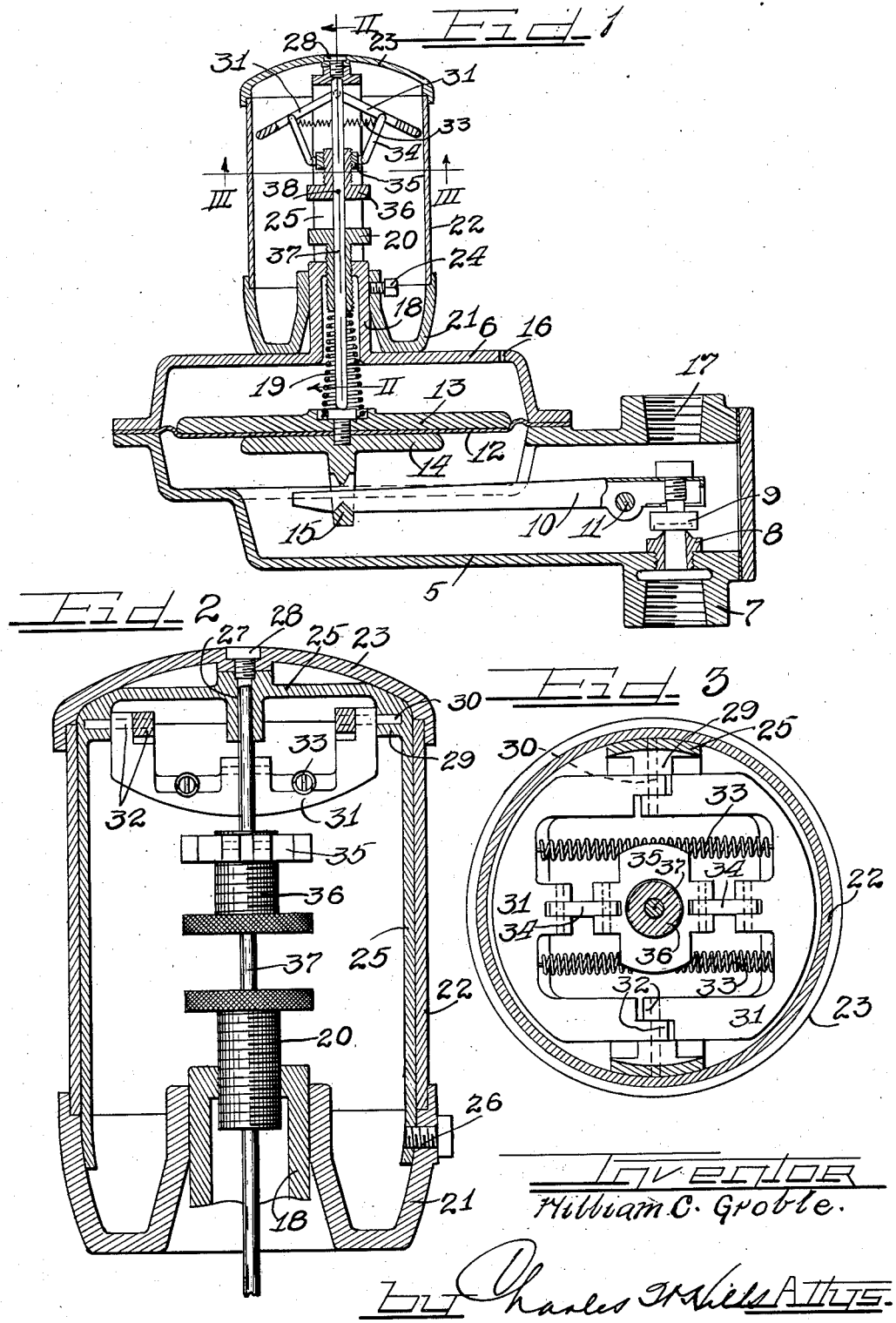

Patented Oct. 1, 1935

2,015,931

UNITED STATES PATENT OFFICE 2,015,931

LOADING DEVICE OR ATTACHMENT FOR FLUID PRESSURE REGULATORS

William C. Groble, Anderson, Ind., assignor to Mueller Co., Decatur, Ill., a corporation of Illinois Application May 17, 1934, Serial No. 726,101

6 Claims. (Cl. 50—26)

This invention relates to improvements in a loading device or attachment for fluid pressure regulators, the invention being highly desirable for use in maintaining a proper outlet pressure on fluid leaving a regulator, regardless of change in volume of outflowing fluid, although the invention will have other and various uses and purposes as will be apparent to one skilled in the art.

In the past, many and various types of fluid pressure regulators have been developed, especially gas line regulators using a diaphragm as a medium of pressure regulation, and while many of these regulators were substantially satisfactory for the purposes for which they were installed, provision had not been made for readily and easily varying the capacity of the regulators to adapt them for different conditions of operation without practically remodeling or replacing the regulators. It is also desirable to provide means for easily adapting a regulator to more accurately function over wide variations in volume of outlet fluid.

With the foregoing in mind, it is an object of this invention to provide a loading device for a fluid pressure regulator which may be readily attached to substantially any well known form of regulator already in use.

It is also an object of this invention to provide a loading device in the nature of a booster for fluid pressure regulators utilizing a diaphragm with some form of loading device already associated with the diaphragm.

A further object of this invention is the provision of a loading device for fluid pressure regulators, which loading device is capable of adapting the regulators to function with extreme accuracy through great changes and sudden variations in the volume of outgoing fluid.

It is also an object of this invention to provide a loading device highly desirable for use in connection with fluid pressure regulators utilizing a diaphragm, the loading device being capable of exerting a gradually increasing pressure upon the diaphragm as the diaphragm moves in a direction resulting in a wider opening of the valve of the regulator.

A further object of this invention is the provision of a fluid regulator mechanism including a regulator diaphragm and the combination of the usual loading means for the diaphragm together with a loading device also for applying pressure to the diaphragm to augment the usual loading means.

Still a further object of this invention is the provision of a fluid regulator mechanism including an indirect actuator for the valve and a usual form of loading means for the actuator, together with a loading device capable of exerting a gradually increasing pressure upon the actuator supplementing the pressure of the said loading means.

The present invention also has for an object the provision of a loading device highly desirable for use in connection with fluid pressure regulators, which loading device functions upon an indirect actuator for a valve and is adjustable so that the load provided by the device may be accurately regulated.

The invention also includes the provision of a loading device which may be attached to and removed from substantially any well known form of fluid pressure regulator with a minimum of effort and without disturbing in any degree the normal functions of the regulator. In other words, to remove the loading device from the regulator, it is simply necessary to release the attachment means and lift the loading device from the regulator, the regulator functioning precisely as it did before the loading device was initially attached.

It is a further object of this invention to provide a loading device for attachment to fluid pressure regulators utilizing a diaphragm, the loading device being readily attachable to the regulator and providing a pressure upon the diaphragm without any direct connection whatsoever with the diaphragm.

In accordance with the general features of this invention, a hollow stud is used in the top casting of a regulator housing, preferably over the central region of the diaphragm. Around this stud, the casing of the loading device is disposed, the casing resting upon the regulator housing. Through the hollow stud a pressure rod projects and contacts with the central portion of the diaphragm, this preferably being a resting contact with no direct engagement between the rod and the diaphragm other than the contact engagement. The outer portion of this rod is positively connected with a spring actuated toggle mechanism prevented from ever assuming a dead center position, the toggle mechanism being such as to exert a gradually increasing pressure through the rod upon the diaphragm as the diaphragm moves in a direction resulting in a wider opening of the valve of the regulator. Means are provided for adjusting the pressure exerted by the rod upon the diaphragm to a very fine nicety. The loading device is mountable in position and removable from the regulator without interfering with the working parts of the regulator, and if the regulator is one already in use, all of the parts of the regulator function as they did prior to the attachment of the loading device, and continue to function as they did after the removal of the loading device, the attachment of the loading device not necessitating any change in the normal working parts of the regulator.

While some of the more salient features, characteristics and advantages of the present invention have been above pointed out, others will become apparent from the following disclosures.

The invention includes these and other features of construction and combinations of parts hereinafter described, and shown in a preferred form in the drawing, and more particularly indicated by the claims.

On the drawing:

Figure 1 is a substantially central vertical sectional view, with parts in elevation, of a fluid pressure regulator equipped with a loading device embodying principles of the present invention.

Figure 2 is an enlarged vertical sectional view, with parts in elevation, taken through the loading device and the upper portion of the regulator housing, substantially as indicated by the line II—II of Figure 1.

Figure 3 is a transverse enlarged bottom plan sectional view through the loading device taken substantially as indicated by the line III—III of Figure 1.

As shown on the drawing:

The present invention is shown operatively associated with a fluid pressure regulator of a known type, the regulator including a diaphragm normally loaded by means of a spring. However, it is to be distinctly understood that the present invention may be associated with regulating devices of various types, and in the event the regulating device includes a diaphragm, this diaphragm might be initially loaded with a spring or with some other means. The particular nature and construction of the regulator itself does not, in any instance of which I am aware, prohibit the use of this invention, and the invention may be attached to a regulator vertically, as shown, obliquely, horizontally, or upside down, depending upon the construction of the regulator.

The illustrated regulator includes a housing comprising a lower casting 5 and a top casting 6. The housing is provided with an inlet 7 in the inner end of which a reducer 8 shaped to form a valve seat is threaded. Seatable upon the reducer 8 is a valve 9 carried adjacent one end of an actuating lever 10 pivotally mounted on a stud 11 extending transversely between the walls of the lower casting 5.

Between the lower and upper castings, 5 and 6 respectively, a diaphragm 12 of usual character is clamped. As is customary, this diaphragm is weighted by means of a top plate 13 and a bottom plate 14, the latter having a depending projection 15 apertured and provided with knife-edged bearing points between which an end of the valve lever 10 is loosely disposed. The top plate 13 and bottom plate 14 are connected in the usual manner by a stud screw.

The top casting 6 of the regulator housing is provided with a vent opening 16 to eliminate any detrimental effect of air pressure upon the diaphragm. The housing is also provided with a fluid outlet 17 disposed preferably oppositely to the inlet 7.

In the particular form of regulator illustrated, the top casting 6 is integrally formed in the central region into a spring housing 18 containing the upper portion of a spring 19 disposed between the top plate of the diaphragm and an adjustable stud 20 threaded into the spring housing. The spring 19, of course, exerts a pressure upon the diaphragm, tending to urge the diaphragm in a direction resulting in the opening of the valve 9; in the illustrative instance, a downward pressure.

The improved loading device of the present invention is shown as mounted upon the top casting 6 of the regulator housing. The loading device includes a casing comprising a dished base member 21 annularly shouldered to receive a body shell 22, and a top member 23 also annularly shouldered to rest over the upper edge of the body shell 22. The lower portion of the base member 21 rests upon the top casting 6 of the regulator housing, and the inner part of the dished base member embraces the spring housing 18. A stud bolt 24 (Figure 1) passing through the inner part of the base member and engaging the spring housing, retains the loading device casing attached to the regulator.

Within the casing of the loading device or attachment is a yoke member 25 held in position by means of a stud bolt 26 passing through the base member and the yoke member. The upper transverse portion of the yoke member is formed into a bearing part 27, the upper end of which is threaded to receive a stud bolt 28 which holds the cover 23 upon the casing. Tightening of the stud bolt 28 results in the compression of the shell 22 between the cover and base members of the casing to afford a rigid structure.

The supporting yoke 25 adjacent the opposite upper corners thereof is provided with integral internal bearing bosses 29, each receiving a fixed stub shaft 30. Oppositely disposed yoke arms 31, each provided with a bearing 32 on each leg thereof loosely engaging the respective stub shaft 30, are rotatable or swingable upon these stub shafts. A pair of transverse springs 33, each having an opposite end engaged with one of the yoke arms 31, tend to draw the free portions of these yoke arms inwardly and downwardly. The free portion of each of the yoke arms 31 is connected by a link 34 to a crosshead 35. The links 34 are freely pivotal at each end thereof. Consequently, the crosshead 35 is urged downwardly by the transverse springs 33 through the toggle mechanism including the yoke arms 31 and the links 34.

The crosshead 35 is internally threaded to receive the shank of a thumbscrew 36 fixedly connected to a pressure rod 37, as indicated at 38 in Figure 1. The lower end of this pressure rod preferably rests upon the central screw in the diaphragm structure, and in view of the threaded engagement between the thumb screw 36 and the crosshead 35, and the fixed engagement between the rod 37 and the thumb screw 36, the transverse springs 33 cause the rod to exert a downward pressure upon the diaphragm construction. The rod 37 is reciprocable upwardly and downwardly in accordance with fluctuations of the diaphragm 12, and the upper end of the rod reciprocates within the bearing part 27 formed on the cross arm of the supporting yoke 25. The lower portion of the rod 37 passes freely through the thumb screw or stud bolt 20 and also through the central portion of the spring 19 bearing upon the diaphragm construction.

Obviously, if the regulator and loading device are initially installed together, they may be assembled together at the factory in an obvious manner. In the event the regulator construction is already in use, it is a very simple expedient to attach the loading device. In all likelihood, the regulator would have a solid thumb screw 20 in the spring housing 18 to prevent the accumulation of moisture within the regulator housing. However, it is a simple expedient to replace such a thumb screw with a hollow thumb screw, as illustrated. The loading device casing is dismantled to the extent of having the cover and the side shell 22 removed. The base member is then disposed over the spring housing with the rod 37 projecting through the thumb screw 20, and the stud screw 24 tightened. The shell 22 may next be placed in position and the cover 23 secured in position by the bolt 28. Prior to the attachment of the side shell and cover, the thumb screw 20 may be adjusted to provide the proper compression for the spring 19, and the other thumb screw 36 may be adjusted to provide the proper pressure of the rod 37 upon the diaphragm.

In adjusting the loading device, the thumb screw 36 is preferably rotated until the rod 37 contacts with the screw in the diaphragm construction. Then this same rotation of the thumb screw 36 is continued causing a spreading of the yoke arms 31. In most instances, these yoke arms will be spread to substantially the position seen in Figure 1, when the adjustment is complete. However, it will be obvious that various degrees of pressure may be obtained by simple adjustments of the thumb screw 36. Due to the advantage obtained through the angular position of the various members of the toggle mechanism, a decrease in tension upon the transverse springs 33 as the rod 37 moves downwardly is offset, so that as the diaphragm moves downwardly the loading device will exert a gradually increasing pressure upon the diaphragm. Consequently, the regulator, aided by the loading device, is capable of maintaining the proper pressure upon outflowing fluid, even through sudden and relatively great variations in either incoming pressure, the volume of outflowing fluid, or both.

It will also be noted that the attachment and removal of the loading device does not affect in any manner the operation of the parts of the regulator. The pressure of the loading device is supplementary to the pressure of the spring 19 or other loading means commonly used in diaphragms of this character.

Of course, it is to be appreciated that the loading device may be mounted in any desirable position, and exert gradually increasing pressure in the direction consistent with a greater opening of the valve of the regulator, in nearly every instance, but always in a direction consistent with maintaining proper pressure upon outflowing fluid.

From the foregoing, it will be apparent that I have provided a loading device or attachment highly desirable for use in connection with fluid pressure regulators, which device may be readily attached to or removed from a regulator already in use without interfering with the working of the component parts of the regulator. Furthermore, the present invention greatly enhances the efficiency and accuracy of the regulator, is simple in construction and operation, may be readily adjusted, requires little attention, is extremely durable, and may be economically manufactured.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination in a fluid pressure regulator assembly, a valve, a pressure responsive diaphragm indirectly controlling said valve, means for imparting pressure on said diaphragm, a rod resting against said diaphragm, and spring actuated toggle mechanism urging said rod against said diaphragm to impart additional pressure on said diaphragm.

2. In combination in a fluid pressure regulator assembly, a housing, regulator mechanism in said housing including a diaphragm, a spring abutting said diaphragm and pressing thereagainst, a rod passing through said spring and engaging said diaphragm, and spring actuated toggle mechanism associated with said rod and applying therethrough additional pressure on said diaphragm.

3. In combination in a fluid pressure assembly, a housing, regulator mechanism in said housing including a diaphragm, a spring housing on the first said housing, a hollow stud extending through the wall of said spring housing, a spring in said housing compressed between said stud and said diaphragm, a casing mounted on the regulator housing around said spring housing, a rod extending from said casing through said stud and said spring into contact with said diaphragm, and means in said casing for applying additional pressure on said diaphragm through said rod.

4. As an article of manufacture, a loading device for applying pressure, comprising a casing, spring actuated toggle mechanism in said casing, a crosshead connected to said toggle mechanism, a stud adjustably connected to said crosshead, and a rod fixed to said stud and extending without said casing in a position to bear upon that to which pressure is to be applied by said loading device.

5. As an article of manufacture, a unitary self-contained loading device for use with a pressure regulator, including an individual closed casing shaped for disposition on a regulator housing, pressure producing toggle mechanism in said casing, and a rod adjustably connected to said toggle mechanism to transmit the pressure developed by said mechanism, said casing having an aperture therein through which said rod projects.

6. In combination, a fluid pressure regulator including a housing, a valve, a pressure responsive diaphragm for controlling said valve, and means for imparting pressure to said diaphragm, all within said housing, said housing having a relatively small aperture therein adjacent said means, and a separate casing shaped for attachment to said housing, said casing containing a rod projecting therewithout through the aperture and said means in said housing to rest against said diaphragm, and means in said casing for urging said rod against said diaphragm to add to the pressure load thereon.

WILLIAM C. GROBLE.